United States Patent [19]
Yoshida

[11] Patent Number: 5,724,441
[45] Date of Patent: Mar. 3, 1998

[54] IMAGE PROCESSING APPARATUS AND METHOD

[75] Inventor: Tadashi Yoshida, Ichikawa, Japan

[73] Assignee: Canon Kabushiki Kaisha, Tokyo, Japan

[21] Appl. No.: 450,682

[22] Filed: May 25, 1995

[30] Foreign Application Priority Data

May 31, 1994 [JP] Japan .................. 6-118624

[51] Int. Cl.$^6$ .................. H04N 1/419
[52] U.S. Cl. .................. 382/166; 358/539; 358/261.3; 358/430
[58] Field of Search .................. 358/426, 429, 358/456, 462, 464, 427, 433, 534, 539; 382/239–240, 250–253; H04N 1/419

[56] References Cited

U.S. PATENT DOCUMENTS

| | | | |
|---|---|---|---|
| 5,295,077 | 3/1994 | Fukuoka | 358/426 |
| 5,345,517 | 9/1994 | Katayama et al. | |
| 5,361,147 | 11/1994 | Katayama et al. | 358/532 |
| 5,363,219 | 11/1994 | Yoshida | 358/433 |
| 5,416,603 | 5/1995 | Suzuki et al. | 358/426 |
| 5,422,736 | 6/1995 | Katayama | 358/462 |
| 5,517,327 | 5/1996 | Nakatani et al. | 358/426 |
| 5,588,069 | 12/1996 | Katayama et al. | 382/239 |

FOREIGN PATENT DOCUMENTS

| | | | |
|---|---|---|---|
| A0441586 | 8/1991 | European Pat. Off. | H04N 1/46 |
| A0507601 | 10/1992 | European Pat. Off. | H04N 1/46 |
| A2163026 | 2/1986 | United Kingdom | H04N 7/12 |

OTHER PUBLICATIONS

"Text/Image Separation by Fax with OCR", IBM Technical Disclosure Bulletin, vol. 37, No. 5, May 1994, pp. 81–82.
"Picture Coding System", Patent Abstracts of Japan, JP 4236574, vol. 17, No. 3, Aug. 25, 1992.
"Color Picture Encoding System", Patent Abstracts of Japan, JP 2292959, vol. 15, No. 70, May 2, 1989.
"Color Picture Processing Method", Patent Abstracts of Japan, JP 4326668, vol. 1&, No. 169, Apr. 26, 1991.

Primary Examiner—Kim Vu
Attorney, Agent, or Firm—Fitzpatrick, Cella, Harper & Scinto

[57] ABSTRACT

In an image processing apparatus and method, such a problem that the user must wait for a long time until region separation processing is completed is solved. A binary-coding unit performs binary coding of a luminance component of input color-image data. An encoding unit performs arithmetic encoding of the binary image data, and another encoding unit performs block encoding of the color-image data, and codes obtained from the two encoding units are stored in different storage units. A predetermined pair of codes read from the storage unit are decoded by decoding units. A region discrimination unit discriminates image regions of decoded binary image data, and outputs data of charcter-line-drawing regions. A color-gradation-image extraction unit extracts data of color-gradation-image regions from decoded color-image data.

12 Claims, 10 Drawing Sheets

あ い う‥‥
か き く‥‥

IMAGE PROCESSING APPARATUS AND METHOD

BACKGROUND OF THE INVENTION

1. Field of the Invention

This invention relates to an image processing apparatus and method, and more particularly, to an image processing apparatus and method for encoding color-image data in order to record it on a recording medium.

2. Description of the Related Art

Recently, it has become easy to store high-definition color-image data due to an increase in the capacity of a storage device. International standardization of encoding methods for various kinds of images has also progressed. So-called JBIG (Joint Bi-level Image Experts Group) method and JPEG (Joint Photographic Experts Group) method are encoding methods which have recently been standardized in the ISO (International Organization for Standardization).

The JBIG method is an encoding method in which information of binary image data is perfectly preserved using a method called a dynamic arithmetic encoding method. Hence, image compression can be performed without degrading characters, line drawings and the like. However, this method is not suitable for compression of data of a gradation image, such as a color natural image or the like because this is a method for binary image data. On the other hand, the JPEG method is an irreversible encoding method for a color natural image. Hence, although degradation is less pronounced even if data of a gradation image, such as a photograph or the like, is encoded with a high compression ratio, peculiar degradation called mosquito noise occurs around characters and fine lines when encoding data thereof. That is, the standardization of JBIG and JPEG has been done assuming that data of a document is encoded according to the JBIG method, and data of a color natural image is encoded according to the JPEG method.

There exists a color image called a color document which includes a color photograph and a document. The assignee of the present application has proposed, in U.S. patent application Ser. No. 357,380 (filed Dec. 16, 1994), a method as shown in FIG. 9 as a method for encoding data of such a color document. In this proposal, character-image regions and color-gradation-image regions of a color document, whose data is to be encoded, are separated from each other. A color image in the character-image region is subjected to JBIG encoding by being converted into binary values comprising black and white, and the color-gradation-image region is subjected to JPEG encoding.

A second method for encoding data of a color document may be considered in which data of a character image is stored by being converted into character codes using an OCR (optical character recognition) technique.

The above-described conventional approaches, however, have the following problems.

That is, a processing time is required for separating regions of a color document. When storing data of a color document in a storage device by encoding it for each region, the user must wait for a long time until the processing is terminated. In the method using the OCR technique, processing for recognizing characters is needed, thereby further increasing the processing time.

SUMMARY OF THE INVENTION

The present invention has been made in consideration of the above-described problems.

It is an object of the present invention to provide an image processing apparatus in which regions are separated at a high speed, and such a problem that the user must wait for a long time until region separation processing requiring a relatively long time is terminated is solved.

According to one aspect, the present invention, which achieves the above-described object, relates to an image processing apparatus comprising quantizing means for quantizing input image data and outputting quantized image data, first memory means for storing the quantized image data, encoding means for encoding the input image data using an encoding method suitable for encoding halftone-image data and outputting the encoded image data, second memory means for storing the encoded image data, and area discriminating means for discriminating an area composed of a predetermined kind of image base on the quantized image data stored in the first memory means.

According to another aspect, the present invention relates to an image processing method comprising the steps of quantizing input image data and outputting quantized image data, storing the quantized image data, encoding the input image data using an encoding method suitable for encoding halftone-image data and outputting encoded image data, storing the encoded image data, and discriminating an area composed of a predetermined kind of image base on the stored quantized image data.

According to still another aspect, the present invention relates to an image processing apparatus comprising quantizing means for quantizing input color-image data and outputting quantized image data, encoding means for encoding the quantized image data output from the quantizing means and the color-image data by different encoding methods, storage means for storing a pair of codes output from the encoding means, decoding means for decoding predetermined codes stored in the storage means, discriminating means for discriminating an image region from the quantized image data decoded by the decoding means, and extraction means for extracting character/line-drawing regions from the quantized image data decoded by the decoding means, and for extracting color-gradation-image regions from the color-image data decoded by the decoding means.

According to yet another aspect, the present invention relates to an image processing method comprising the steps of quantizing input color image data and outputting quantized image data, encoding the quantized image data output in the quantizing step and the color image data by different encoding methods, storing a pair of codes output in the encoding step in storage means, decoding predetermined codes stored in the storage means, discriminating image regions from the quantized image data decoded in the decoding step, and extracting character/line-drawing regions from the quantized image data decoded in the decoding step and extracting color-gradation-image regions from the color image data decoded in the decoding step.

The foregoing and other objects, advantages and features of the present invention will become more apparent from the following detailed description of the preferred embodiments taken in conjunction with the accompanying drawings.

BRIEF DESCRIPTION OF THE DRAWINGS

FIG. 5 is a diagram illustrating a second embodiment of the present invention in which the present invention is applied to a general-purpose computer, such as a personal computer, a work station or the like;

DETAILED DESCRIPTION OF THE PREFERRED EMBODIMENTS

Preferred embodiments of the present invention will now be described in detail with reference to the drawings.
First Embodiment FIG. 1 is a block diagram illustrating the configuration of an image processing apparatusa according to a first embodiment of the present invention.

Figure 1:
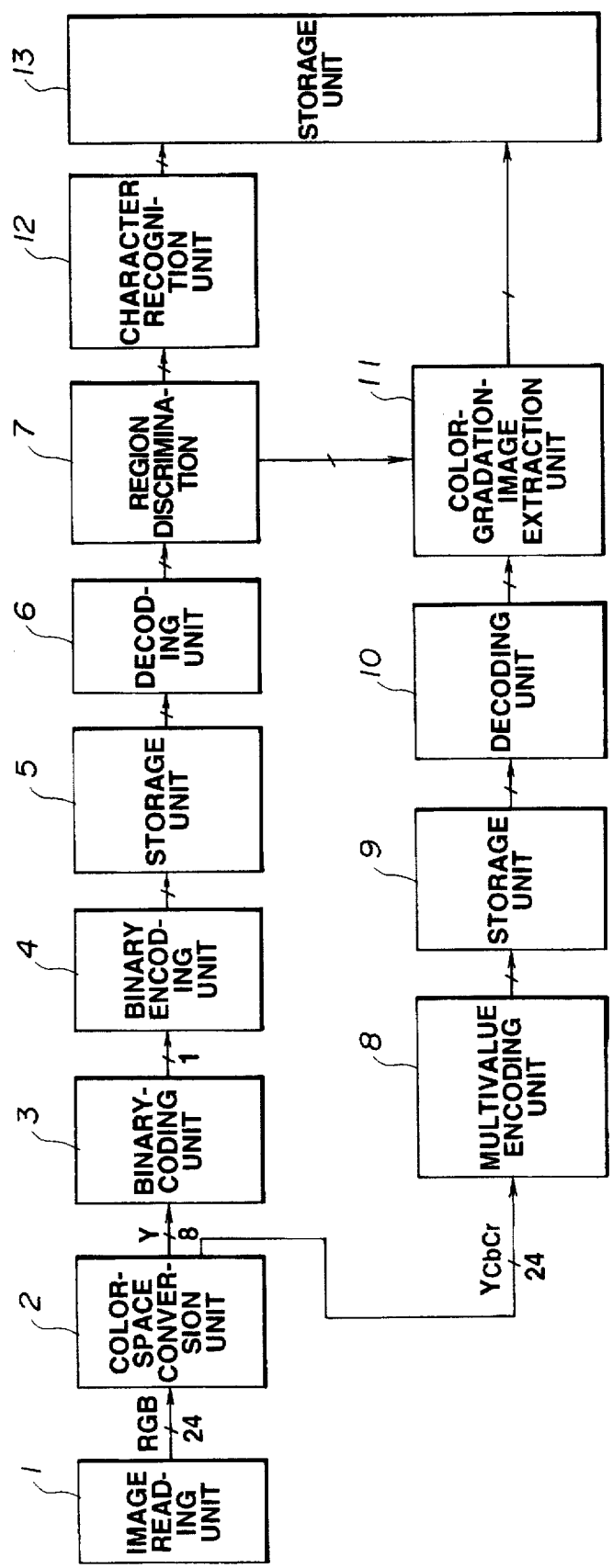
FIG. 1 is a block diagram illustrating the configuration of an image processing apparatus according to a first embodiment of the present invention.

In FIG. 1, an image reading unit 1 reads an image of an original, and outputs, for example, a 24-bit RGB full-color image data. In the present embodiment, a 400-dpi (dots per inch) image scanner generating data comprising 8 bits for each of R, G and B signals is used.

A color-space conversion unit 2 converts the RGB image data input from the image reading unit 1 into luminance data or lightness data and color data (for example, image data comprising 8 bits for each of Y, Cb and Cr signals. This conversion is performed according to the following expressions:

$$Y=0.299R+0.587G+0.114B$$

$$Cb=0.664(B-Y)+128 \quad (1)$$

$$Cr=0.713(R-Y)+128.$$

A binary-coding unit 3 receives a Y (luminance) component from among the YCbCr image data output from the color-space conversion unit 2, and outputs binary image data obtained by performing simple binary coding of the received value with a predetermined threshold.

A binary encoding unit 4 performs binary encoding of binary image data input from the binary-coding unit 3 according to the JBIG encoding method, and the obtained image data is stored in a storage unit 6. Any method may also be used as the encoding method of the binary encoding unit 4 provided that an entropy encoding method using arithmetic encoding, such as the JBIG encoding method or the like, is adopted.

A multivalue encoding unit 8 receives the YCbCr image data output from the color-space conversion unit 2, and encodes the data according to a multivalue block encoding method using, for example, 8×8 DCT (discrete cosign transform) (orthogonal transformation), such as the JPEG encoding method or the like. The encoded image data is stored in a storage unit 9.

As described above, in the present embodiment, a color image is represented by code data obtained by two kinds of encoding methods, i.e., code data obtained by performing arithmetic encoding of binary-coded data of a luminance component, and code data obtained by performing block-encoding of color-image data. The two kinds of code data are stored in the storage units 5 and 9, and are controlled as image data of the image. This encoding processing is a series of sequential processing in which an image is processed from above to below. Hence, it is also possible to consecutively process a plurality of images, and to store code data for each of the images in the storage units 5 and 9. Although in the foregoing description, the storage unit 5 for storing code data of binary-image data and the storage unit 9 for storing code data of color-image data are separately provided, the two storage units may be combined into a single storage unit. For example, a predetermined region of a storage unit, such as a RAM, a hard disk or the like, may be used as the storage unit 5, and another predetermined region may be used as the storage unit 9. The capacity of the storage units 5 and 9 equals at least a capacity capable of storing code data of a color image.

Data of a desired image from among one or a plurality of images stored in the storage units 5 and 9 is converted into character data and color-gradation-image data according to the following processing.

A decoding unit 6 decodes the code data subjected to arithmetic encoding read from the storage unit 5 and outputs binary image data. This decoding processing is, of course, processing which is inverse to the processing of the binary encoding unit 4.

Figure 2A:
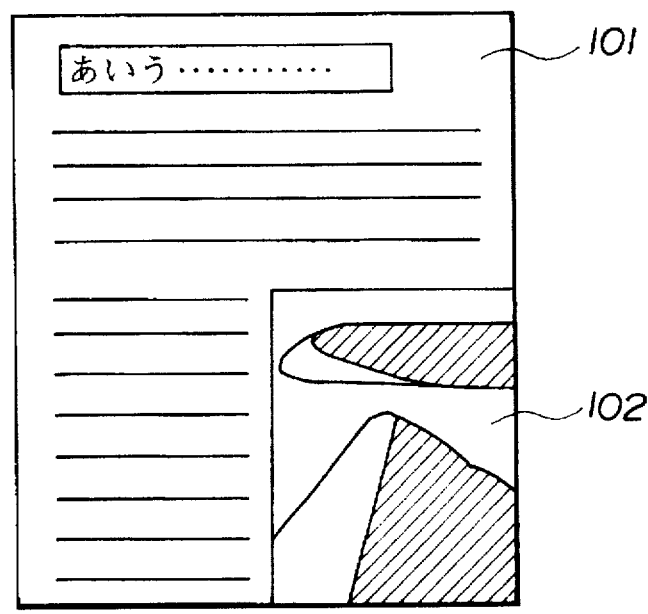
FIGS. 2(a) and 2(b) are diagrams illustrating character image extraction processing in the first embodiment.
Figure 2B:
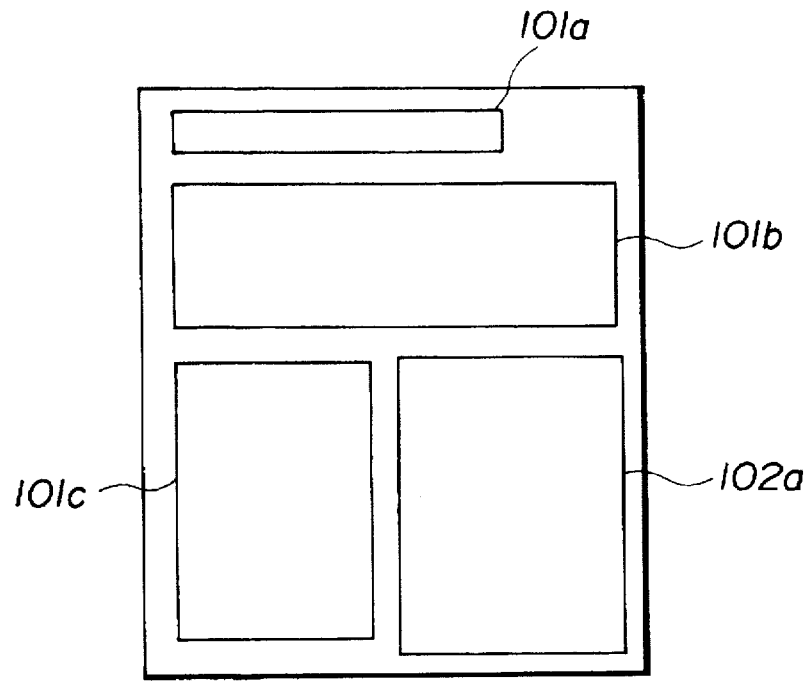

A region discrimination unit 7 executes character-image extraction processing as shown in FIGS. 2(a) and 2(b) for the binary image data input from the decoding unit 6.

FIG. 2(a) illustrates a decoded binary image. In FIG. 2(a), reference numeral 101 represents a character-image region, and reference numeral 102 represents a color-gradation-image region. These two regions can be separated because they have different properties.

That is, the character-image region has the following characteristics:

(1) The area of each group comprising connected pixels is small.

(2) The groups of pixels are arranged in a horizontal direction (in the case of a horizontally-written document) or in a vertical direction (in the case of a vertically-written document).

(3) The area of black pixels is smaller than the area of white pixels.

Figures 3A, 3B:
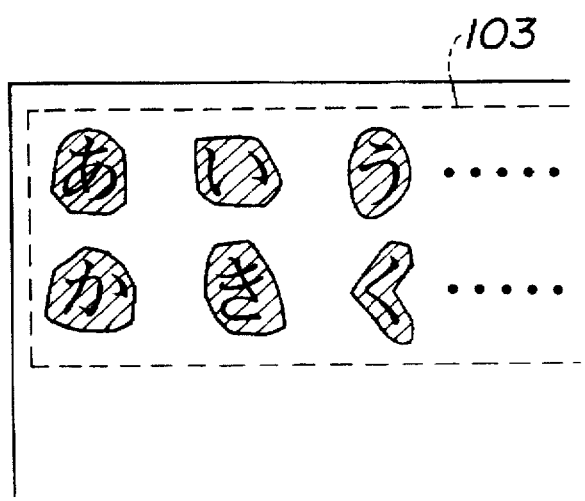
FIGS. 3(a) and 3(b) are diagrams illustrating an example of discrimation of character-image portions in the first embodiment.

FIGS. 3(a) and 3(b) illustrate an example of discrimination of a character-image portion utilizing the above-described characteristics. FIG. 3(a) illustrates a case of an image of horizontallly-written characters (in this example, " . . . "), in which processing of interpolating a space between pixels constituting each character is performed. For example, when processing of replacing white pixels by black pixels if a space between black pixels is equal to or less than n pixels (n being a small number) is performed, an image, in which groups of black pixels including respective characters are aligned in a horizontal direction, is obtained, as shown in FIG. 3(b). A region 103 can be discriminated as a character-image region due to the aligned groups of black pixels.

A character region can be cut as a rectangular region by performing such processing. As shown in FIG. 2(b), the character-image region 101 shown in FIG. 2(a) can be discriminated as rectangular regions 101a, 101b and 101c. Furthermore, by taking into consideration the size of each group of black pixels, in the case of FIG. 2(b), it is possible to recognize a region 101a as a caption-character region, and to recognize regions 101b and 101c as sentence regions.

On the other hand, the color-gradation-image region subjected to binary-coding processing has the following characteristics.

(1) The area of each group comprising connected pixels is large.

(2) The number of fine lines is small.

(3) There is little difference between the area of white pixels and the area of black pixels.

In the case of FIG. 2(a), the area of each group of black pixels in the color-gradation-image region 102 subjected to binary-coding processing is large. For example, an image of a mountain, a cloud or the like can be easily discriminated because the area of connected black pixels or white pixels is large. Such a portion can be recognized as a rectangular region as represented by reference numeral 102a in FIG. 2(b).

Figure 4:
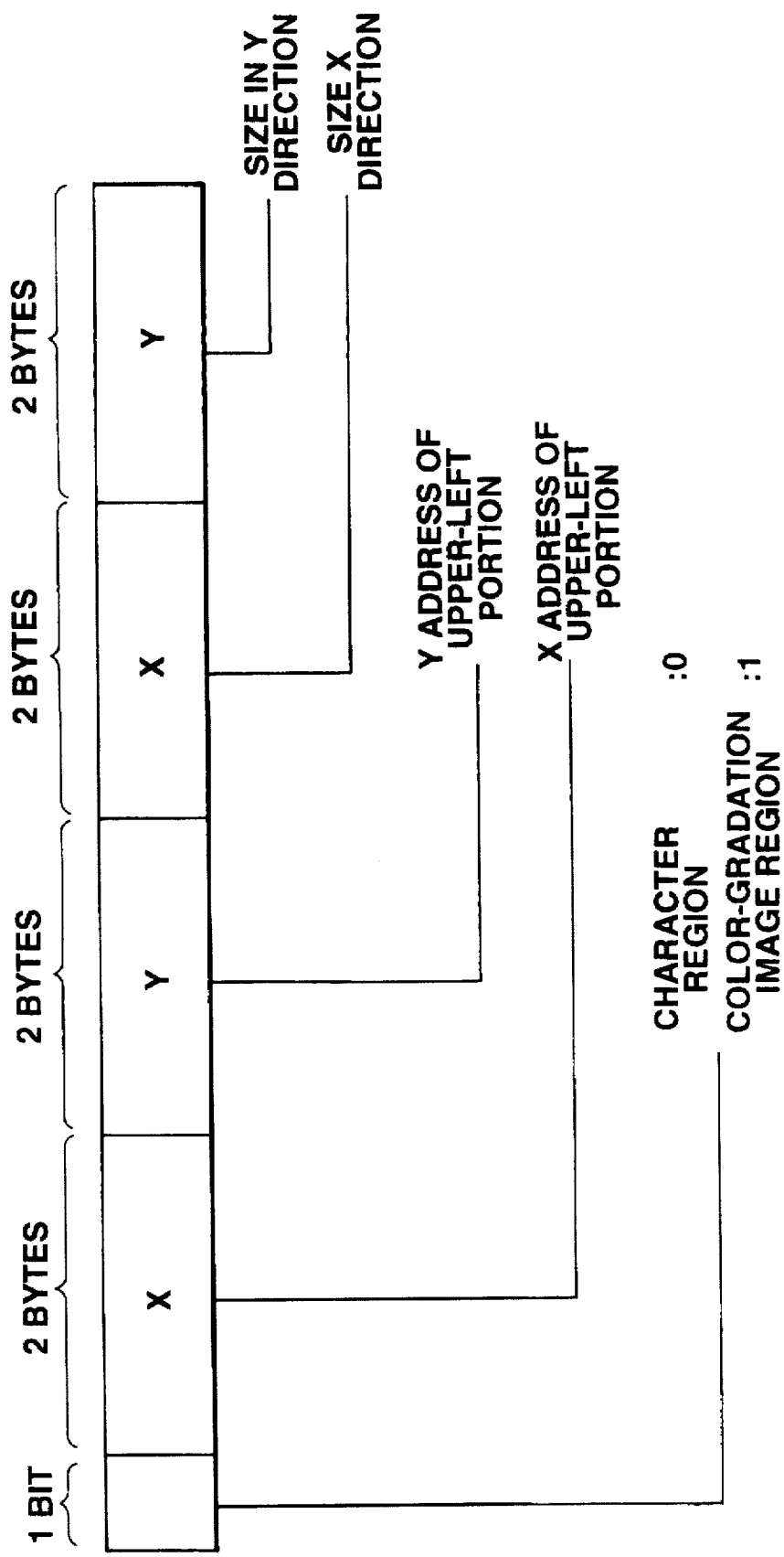
FIG. 4 is a diagram illustrating a format of information relating to image regions discrimated in the first embodiment.

As described above, the region discrimination unit 7 discriminates between character-image regions and color-gradation-image regions from image data obtained by performing binary-coding processing of data of a color image, and transmits the attribute of each discriminated rectangular region, the address of the upper left portion of the region, and the size of the region in the x direction and the y direction to a color-gradation-image extraction unit 11 (to be described later in detail) as data having a format as shown in FIG. 4. On the other hand, binary-image data discriminated to be in the character-image regions is sectioned for each rectangular region and is transmitted to a character recognition unit 12 (to be described later in detail).

Referring again to FIG. 1, a decoding unit 10 decodes data subjected to block encoding read from the storage unit 9, and outputs color-image data. This decoding processing is, of course, processing which is inverse to the processing of the multivalue encoding unit 8.

A color-gradation-image extraction unit 11 extracts data of color-gradation-image regions from the decoded color-image data by referring to the result of the discrimination by the region discrimination unit 7, and stores the extracted color-gradation-image data in a storage unit 13 together with the color-gradation-image-region information shown in FIG. 4. The color-gradation-image data output from the color-gradation-image extraction unit 11 may also be stored in the storage unit 13 by being compressed again by performing block-encoding processing or the like. In such color-gradation-image extraction processing, it is not always necessary to decode code data into original-image data. It is also possible to extract data of color-gradation-image regions by sectioning the result of discrimination of the region discrimination unit 7 into rectangles, for example, in units of 8×8 pixels (in units of the block size of block codes) utilizing a property of block codes.

A character recognition unit 12 recognizes each character from binary image data input by being sectioned into each rectangular region, and converts the recognized character into a code corresponding thereto. The converted character code is stored in the storage unit 13 together with the character-image-region information shown in FIG. 4 and information indicating the position of the character within the corresponding rectanguler region, as well as attribute information indicating the size and the kind of the character, and the like whenever necessary. It is also possible to store character codes output from the character recognition unit 12 in the storage unit 13 by being compressed, for example, according to Huffman encoding, LZ encoding or the like.

As described above, in the present embodiment, a color image is represented by two kinds of data, i.e., color-gradation-image data, and character codes corresponding to characters within character-image regions. These two kinds of data are stored in the storage unit 13, and are controlled as data of an image. As described above, these two kinds of data include region information and the like. If, for example, a large-capacity magnetic storage device (a hard-disk device, a magnetooptical-disk device or the like) is used as the storage unit 13, data of a large number of color images, such as color documents or the like, can be stored.

According to the present embodiment, the following functions can be obtained.

(1) Data of the entire input color image is stored in a storage unit by encoding the data in the form of a binary image data of a luminance component and in the form of color-image data. Hence, for example, the user can arrange such that region separation processing and character recognition processing requiring a relatively long processing time are executed while the user performs an operation using another apparatus or takes a rest, thereby preventing the problem of waiting for a long time until the processing is completed.

(2) Since a color image is represented by character codes and color-gradation-image data and the obtained data are separately stored, a character image portion is replaced by character codes, which can be easily reedited using word-processor software or the like.

(3) Since a color-gradation-image data obtained by removing character-image data from color-image data is encoded, the compression efficiency can be improved.

(4) Since regions are separated based on the result of discrimination of regions in the form of binary-image data, the discrimination processing can be performed at a high speed.

Second Embodiment

A description will now be provided of an image processing apparatus according to a second embodiment of the present invention. In the second embodiment, components which are substantially the same as those in the first embodiment are indicated by the same reference numerals, and a description thereof will be omitted.

Figure 5:
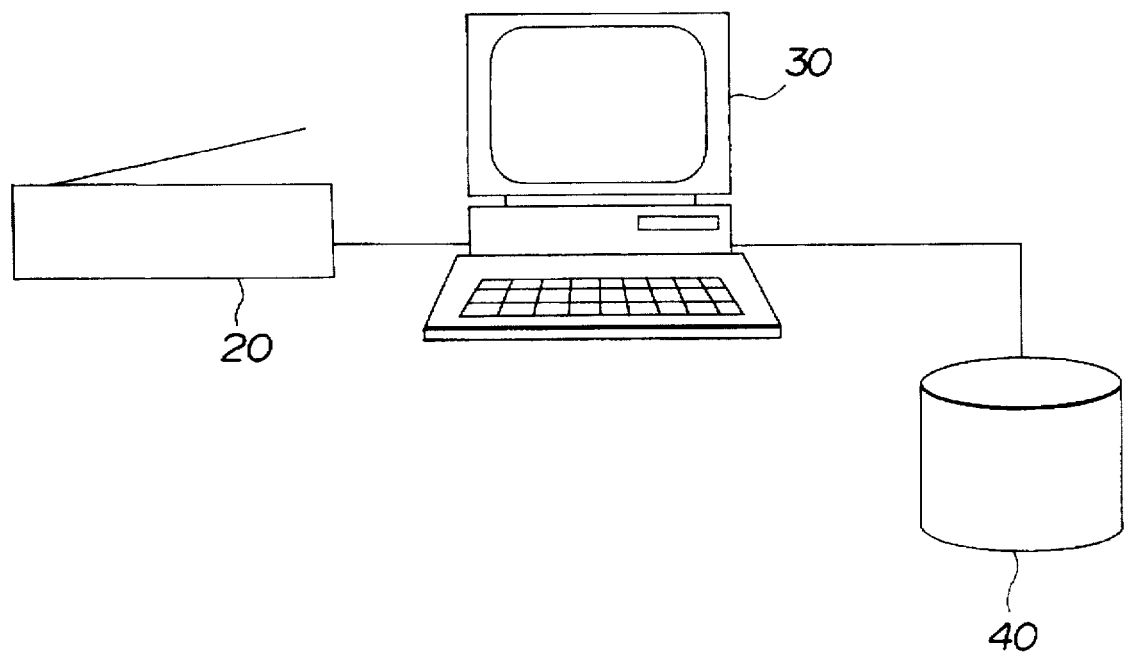

FIG. 5 is a diagram illustrating the case of the second embodiment in which the present invention is applied to a general-purpose computer, such as a personal computer, a work station or the like.

In FIG. 5, a scanner 20 reads a full-color image. Reference numeral 30 represents a general-purpose computer. Reference numeral 40 represents a magnetic storage device, such as a hard-disk device, a magnetooptical-disk device or the like. The computer 30 does not require particular hardware.

Figure 6:
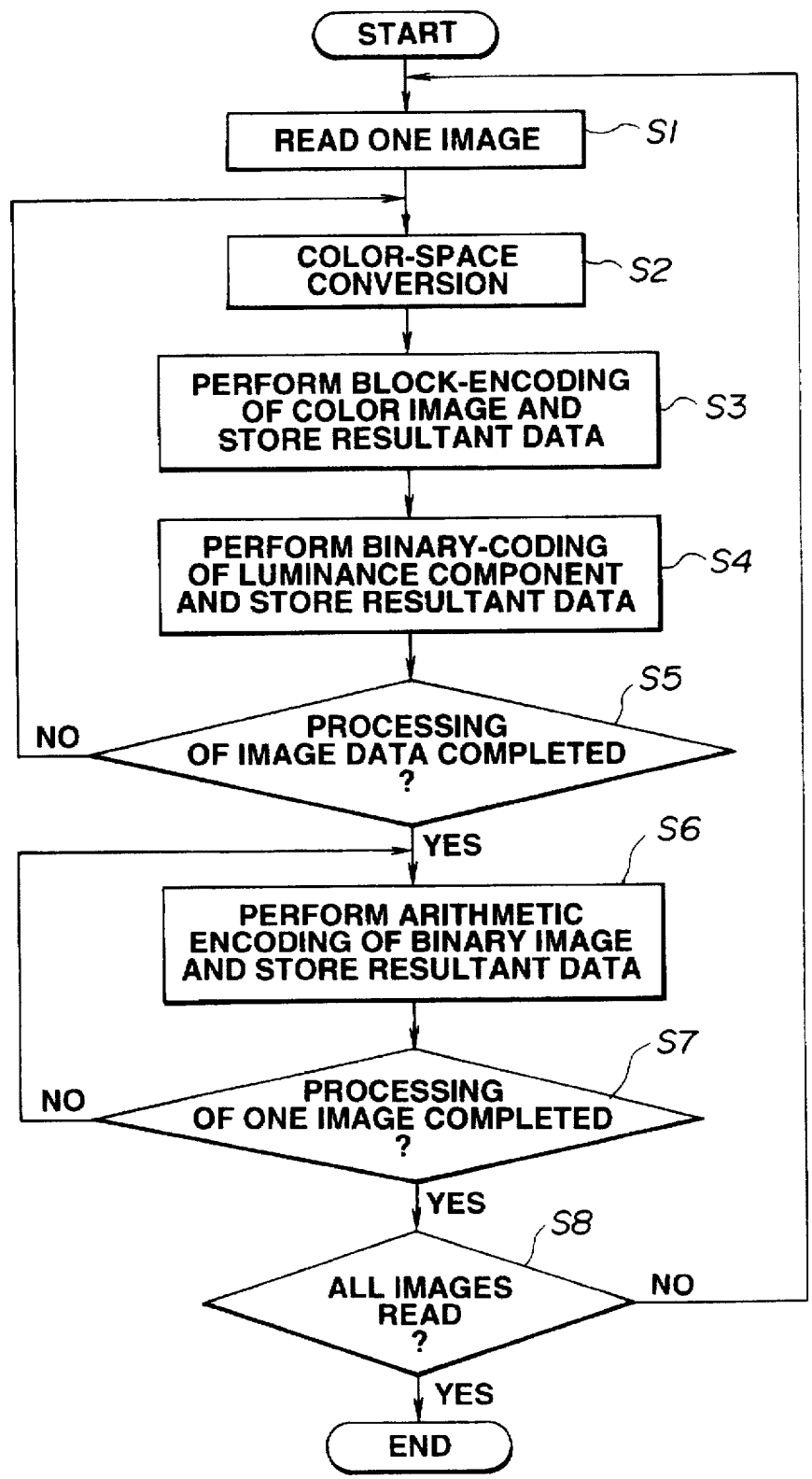
FIGS. 6 and 7 are flowcharts illustrating image processing procesures in the second embodiment.
Figure 7:
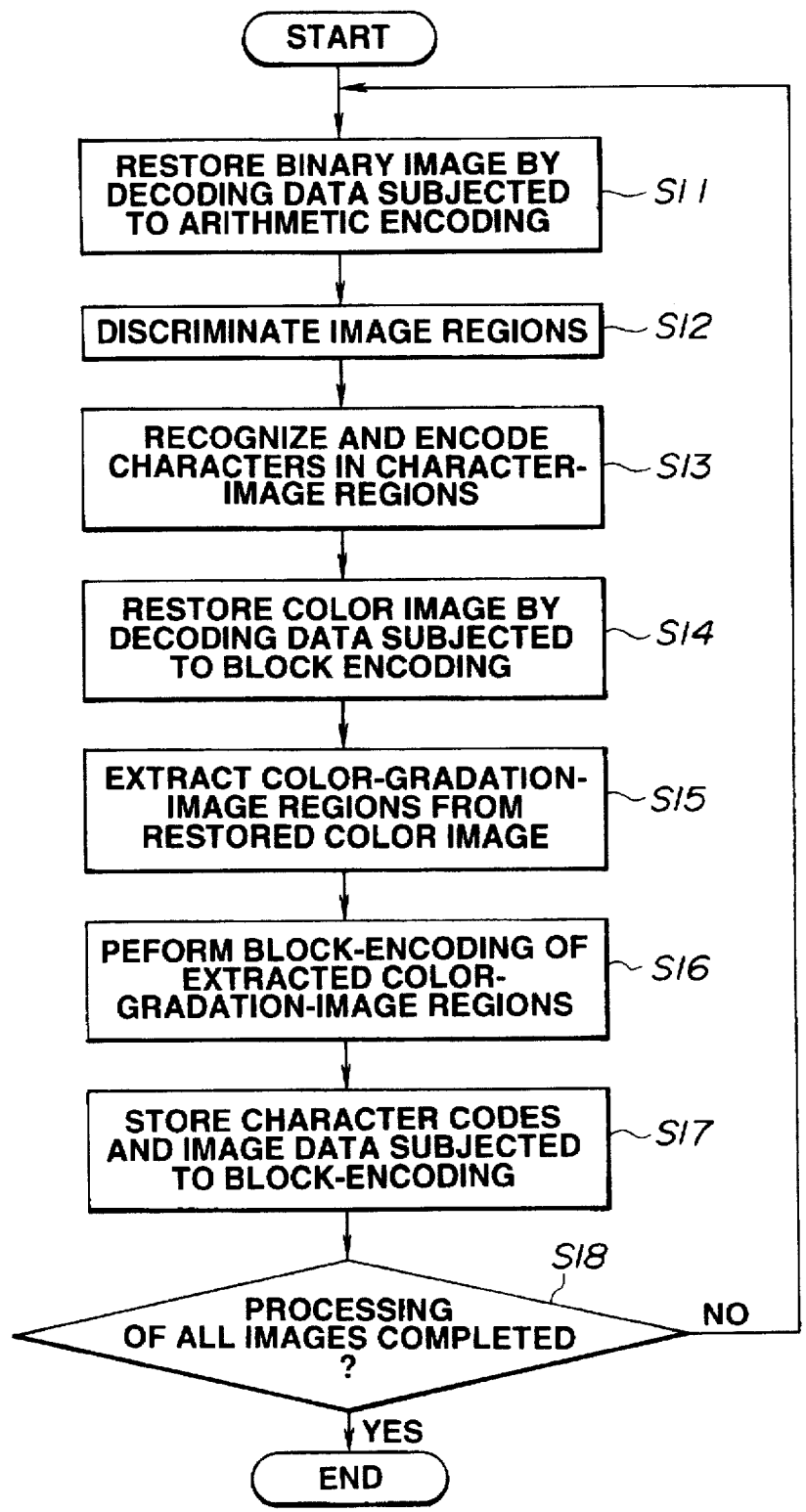

FIGS. 6 and 7 are flowcharts illustrating image processing procedures in the second embodiment, which are executed according to software operating in the computer 30. Such software is stored in the magnetic storage device or the like incorporated in the computer 30.

In FIG. 6, in step S1, the computer 30 reads a color image using the scanner 20. In step S2, the color space of the read full-color image data is converted from an RGB color space into a YCbCr color space. In step S3, block encoding, according to the JPEG encoding method or the like, is sequentially peformed for the YCbCr data, and the resultant data is stored in the magnetic storage device 4.

In step S4, Y data representing a luminance component is sequentially subjected to binary coding, and the resultant data is stored in the magnetic storage device 40. In step S5, it is determined if processing for image data of the one image has been completed. The processing from step S2 to step S4 is repeated until the processing for the image data is completed.

Upon completion of processing of data of the one image, in step S6, binary image data is read from the magnetic storage device 40, and is subjected to arithmetic encoding according to the JBIG encoding method or the like. In step S7, it is determined if processing for binary image data of the one image has been completed. The processing of step S6 is repeated until the processing for the image data is completed.

Upon completion of processing of binary image data for the one image, in step S8, it is determined if all images have been read. The processing from step S1 to step S7 is repeated until all image are read.

According to the above-described processing, a color image is represented by two code data, i.e., code data obtained by performing arithmetic encoding of binary-coded luminance-component data, and code data obtained by performing block encoding of color-image data. The computer 30 stores these two kinds of code data in the magnetic storage device 40 as image data of the one image and controls the stored data. By consecutively performing the above-described processing, it is possible to store image data of a plurality of color images in the magnetic storage device 40 in a short time, and to execute the following processing shown in FIG. 7 while the user performs an operation using another apparatus or takes a rest.

In FIG. 7, in step S11, the computer 30 decodes data subjected to arithmetic encoding stored in the magnetic storage device 40 to restore a binary image. In step S12, image regions in the restored binary image are discriminated to separate character-image regions and color-gradation-image regions from each other. In step S13, characters in the character-image regions separated in step S13 are recognized and encoded.

In step S14, data subjected to block encoding stored in the magnetic storage device 40 is decoded to restore color-image data. In step S15, color-gradation-image regions are extracted from the restored color-image data based on the result of the discrimination of image regions. In step S16, color-gradation-image data extracted in step S15 is again subjected to block encoding.

In step S17, codes of characters in the character-image regions and the encoded color-gradation-image data are stored in the magnetic storage device 40. As described in the first embodiment, these two kinds of data include region information and the like. In step S18, it is determined if processing of all image has been completed. The processing from step S11 to step S18 is repeated until processing of all image is completed.

As described above, according to the second embodiment, the same functions as in the first embodiment can be obtained. Furthermore, by separating data of a color image into character codes and color-gradation-image data and storing the separated data in a magnetic storage device, for example, it is possible to retrieve a string of specific characters using character codes, or to separately utilize character codes or color-gradation-image data. In addition, since only color gradation image can be displayed, image retrieval can be performed at a high speed.

Modifications

Figure 8:
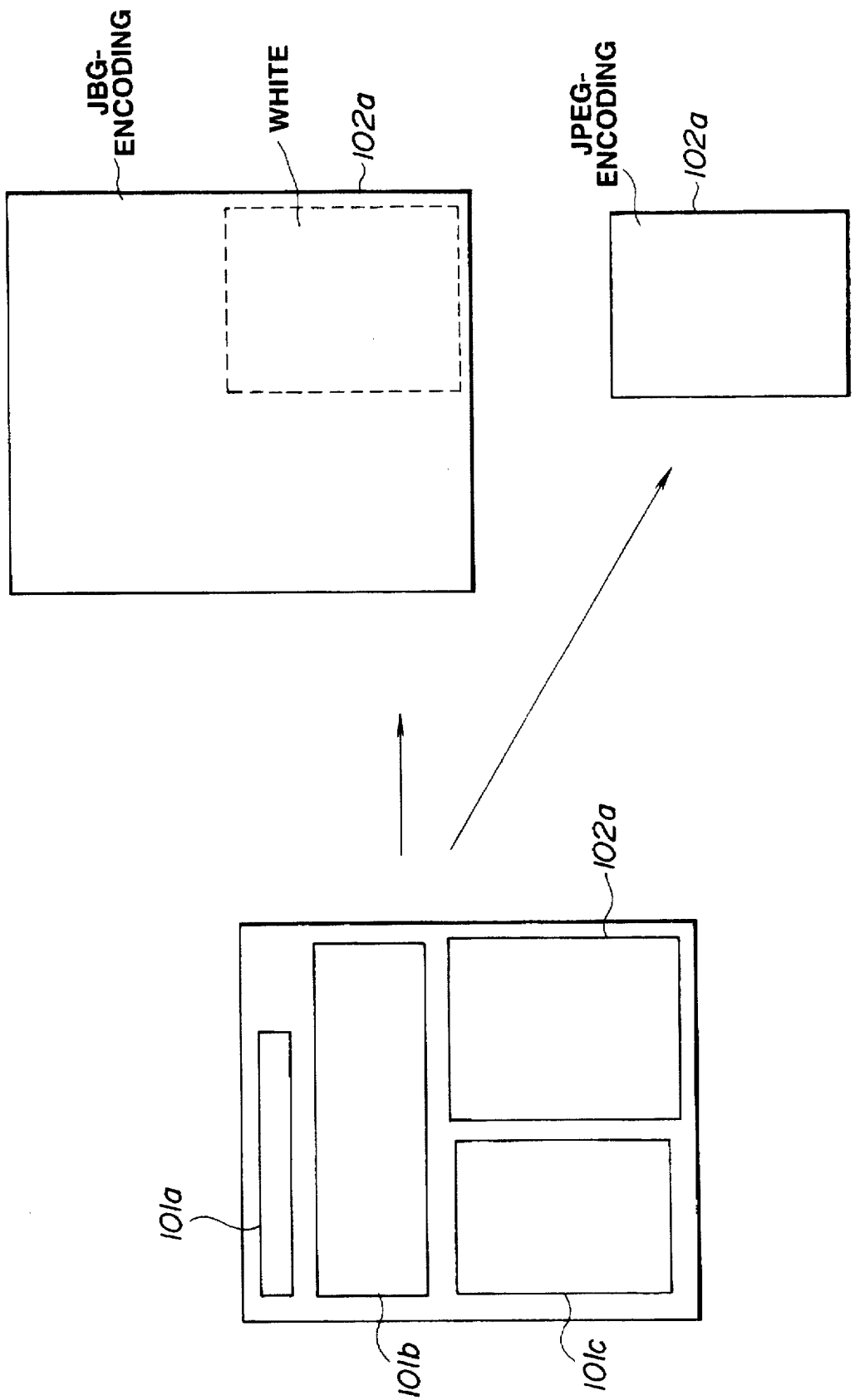
FIG. 8 is a diagram illustrating a modification of the embodiments in which a character image region is encoded as an image.
Figure 9:
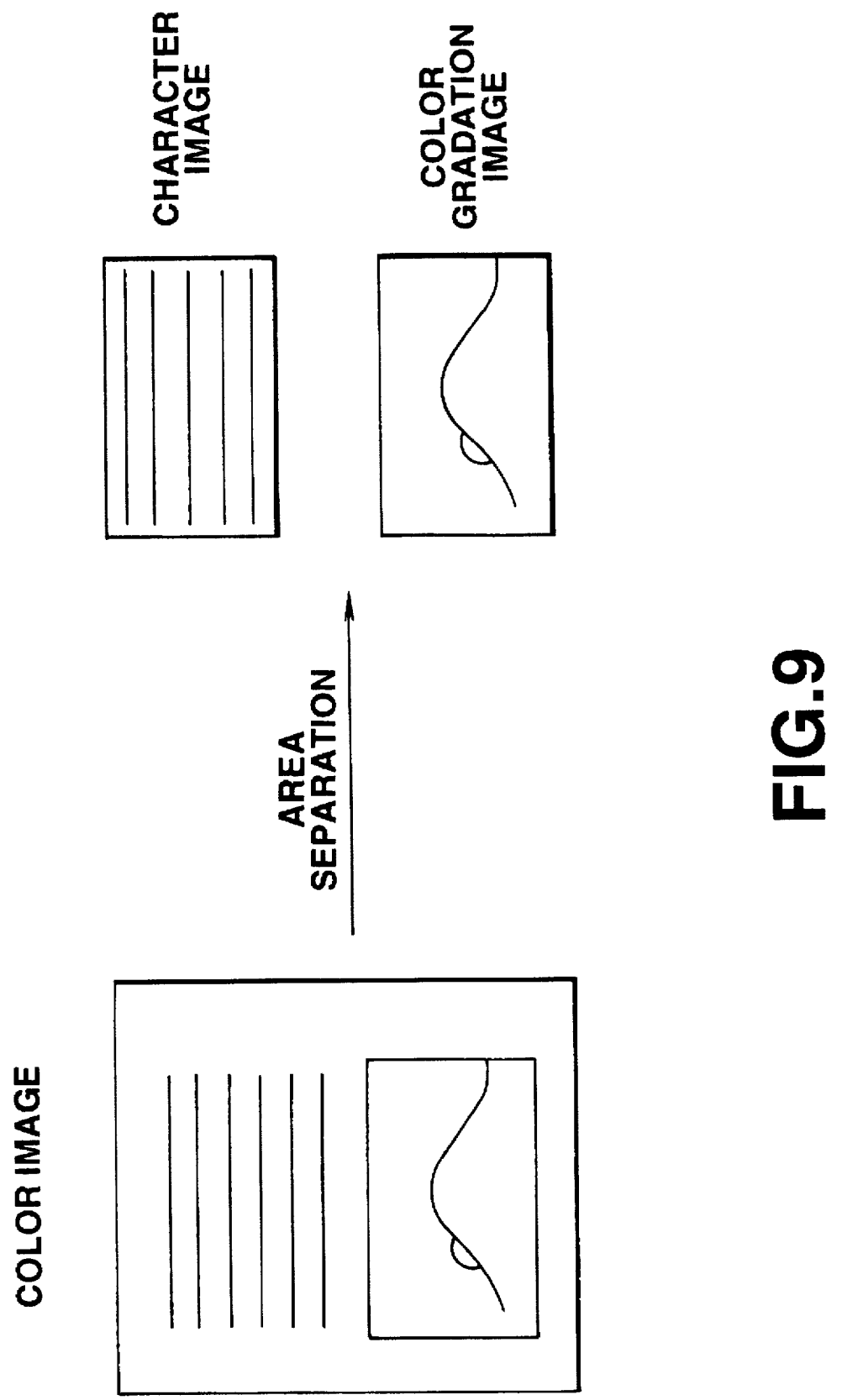
FIG. 9 is a diagram illustrating a method of encoding a color document.

Although in the above-described embodiments, characters in character-imager regions are recognized and encoded, the characters may also be encoded as images and stored in the storage unit. That is, as shown in FIG. 8, a color-gradation-image region 102a is subjected to JPEG encoding, and binary image data in remaining regions after replacing the region 102a with white pixels, i.e., character-image regions, is subjected to JBIG encoding. Such an approach is effective, for example, when the recognition rate of characters is low, for example, due to inferior quality of the read image, or when the read image cannot be encoded into character codes because the image includes line drawings comprising graphs, tables or the like.

Furthermore, it is also possible to determine whether each character-image region is to be encoded into character codes or subjected to JBIG encoding. Hence, an image can be more effectively separated into regions such that a region having a small character size and therefore a low character recognition rate is subjected to JBIG encoding, and a region having a sufficiently large character size and therefore a high character recognition rate is encoded into character codes, and the obtained data can be stored.

Figure 10:
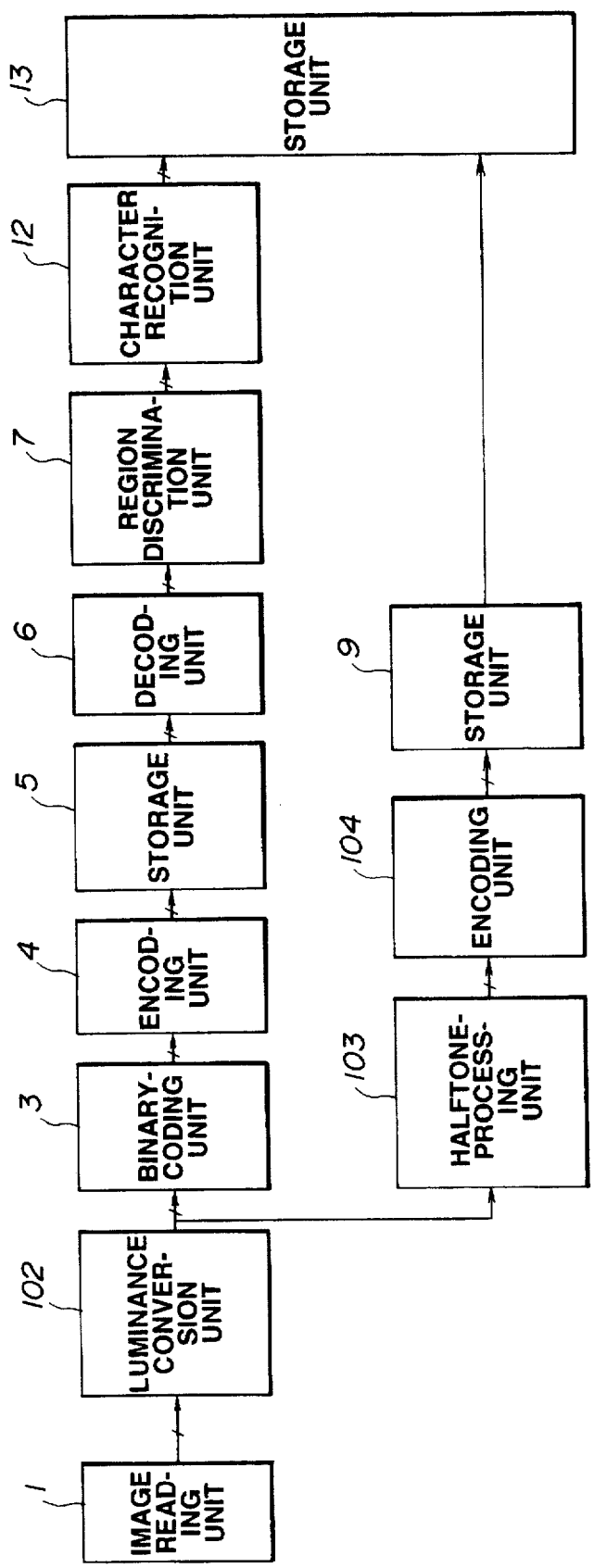
FIG. 10 is a diagram illustrating a modification of the embodiments.

As shown in FIG. 10, a system may be provided in which data of an image subjected to color image reading is stored as data of a black-and-white image.

In FIG. 10, a luminance conversion unit 102 converts RGB data into luminance data Y, and supplies the data to a binary-coding unit 3 and a halftone-processing unit 103. The binary-coding unit 3 performs binary-coding processing with a single threshold which can easily extract data of a character/line drawing image. The halftone-processing unit 103 performs binary-coding processing which is suitable for a halftone image, such as a dither method, an error diffusion method, an average-density preservation method, or the like. Components from an encoding unit 4 to a region discrimination unit 7 and a character recognition unit 12 are the same as those in the first embodiment. An encoding unit 104 performs encoding according to a lossless encoding method, such as the JBIG method or the like.

A storage unit 9 stores code data from the encoding unit 104 for a time period necessary for recognition by the region recognition unit 7 and for recognition by the character recognition unit 12. Character codes output from the character recognition unit 12 and code data from the storage unit 9 are stored in a storage unit 13 so as to correspond to each other.

According to the modification shown in FIG. 10, since information relating to characters which have not been recognized as characters due to errors in the character recognition unit 12 remains in the form of information from the halftone-processing unit 103, missing in characters can be prevented when reproducing information stored in the storage unit 13.

In the above-described modification, the encoding unit 4 and the decoding unit 6 are not always necessary. Instead of using these units, uncompressed image data may be stored in the storage unit 5.

Although in the foregoing embodiments, a description has been provided of a case in which image data in an RGB color space is converted into image data in a YCbCr color space, the color space into which the image data is converted is not limited to the above-described color space. For example, the image data may be converted into a color space including a luminance component, such as a YIQ color space, an $L^*u^*v^*$ color space, an $L^*a^*b^*$ color space or the like. Furthermore, image data of a color space including a luminance component may be directly input to an output terminal of the color-space conversion unit 2. A character-image region is not always expressed in binary values, but may, for example, be expressed in three values or four values provided that the number of values is less than the number of bits. Character data is not always encoded by the JBIG method, but any other entropy encoding method, such as MH (modified Huffman), MR (modified read), MMR (modified modified read) or the like, may also be used. Image data is not always encoded by the JPEG method, but any other block encoding method, such as vector quatization or the like, may also be used.

The present invention may be applied to a system comprising a plurality of apparatuses, such as a scanner, a host computer, a magnetooptical-disk device and the like, or to an apparatus comprising a single unit, such as a copier or the like.

The present invention may, of course, be applied to a case in which the object of the invention is achieved by supplying a system or an apparatus with programs stored in a storage medium, such as a floppy disk or the like.

As described above, according to the present invention, the speed of region separation is increased, and the problem that the user must wait for a long time until region separation processing and the like requiring a relatively long time are completed is solved.

The individual components designated by blocks in the drawings are all well known in the image processing apparatus and method arts and their specific construction and operation are not critical to the operation or the best mode for carrying out the invention.

While the present invention has been described with respect what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:

quantizing means for quantizing input image data and outputting quantized image data;

first encoding means for encoding the quantized image data output from said quantizing means and generating first encoded data;

second encoding means for encoding the input image data and generating second encoded data;

storage means for storing the first encoded data;

decoding means for decoding first encoded data stored in the storage means;

discriminating means for discriminating an image region from the quantized image data decoded by said decoding means; and extracting means for extracting character/line-drawing regions from the quantized image data decoded by said decoding means.

2. An apparatus according to claim 1, wherein said quantized image data is binary image data, and wherein said first encoding means performs entropy encoding of the binary image data, and said second encoding means performs block encoding of the image data.

3. An apparatus according to claim 1, further comprising third encoding means for recognizing and encoding characters in the character-image region extracted by said extracting means.

4. An image processing apparatus comprising:

quantizing means for quantizing input multivalue image data and generating quantized data;

first storage means for storing at least one picture of said quantized data;

discriminating means for discriminating a first region of said input multivalue image based on the quantized data stored in said first storage means;

first encoding means for encoding the first region image discriminated by said discriminating means by first method and generating first data; and second encoding means for encoding said input multivalue image including said first region by a second method and generating second data.

5. An image processing apparatus according to claim 4, wherein said first encoding means performs OCR processing of said first region image.

6. An image processing apparatus according to claim 4, wherein said second encoding means converts said input multivalue image into a binary image, encodes said binary image and generates the second data.

7. An image processing apparatus according to claim 6, wherein said input multivalue image is converted into a binary image by the dither method.

8. An image processing apparatus according to claim 6, wherein said input multivalue image is converted into a binary image by the error diffusion method.

9. An image processing apparatus according to claim 4, wherein said second encoding means generates the second data by encoding said input multivalue image by the lossless method.

10. An image processing apparatus according to claim 4, wherein said second encoding means generates the second data by encoding said input multivalue image by the JBIG method.

11. An image processing method comprising the steps of:

quantizing input multivalue image data and outputting quantized data;

storing at least one picture of said quantized data;

discriminating a first region of said input multivalue image based on the quantized data stored in said storing step;

encoding the first region image discriminated in said discriminating step by a first encoding method and generating first data; and encoding said input multivalue image including said first region by a second encoding method which is different from said first encoding method and generating second data.

12. An image processing method comprising the steps of:

quantizing input image data and outputting quantized image data;

encoding the quantized image data output in said quantizing step by first encoding method and generating first encoded data;

encoding the input image data by a second encoding method which is different from the first encoding method and generating second encoded data;

storing the first encoded data in storage means;

decoding the first encoded data stored in the storage means;

discriminating an image region from the quantized image data decoded in said decoding step; and extracting character/line-drawing regions from the quantized image data decoded in said decoding step.

* * * * *

UNITED STATES PATENT AND TRADEMARK OFFICE
CERTIFICATE OF CORRECTION

PATENT NO. : 5,724,441
DATED : March 3, 1998
INVENTOR(S) : Tadashi Yoshida

It is certified that error appears in the above-identified patent and that said Letters Patent is hereby corrected as shown below:

On the Title page, Item [56]

OTHER PUBLICATIONS

After "Color Picture Processing Method", "vol 1&,"
        should read --vol. 17,--.

COLUMN 3

Line 12, "procesures" should read --procedures--
        and "embodiment." should read --embodiment;--;
    Line 28, "apparatusa" should read --apparatus--;
    Line 38, "signals." should read --signals).--;
    Line 43, "Cb=0.664(B-Y)+128" should read
        --Cb=0.564(B-Y)+128--; and
    Line 62, "cosign" should read --cosine--.

COLUMN 4

Line 51-52, "...") should read -- "あいう...") --;
    Line 58, "obtained," should read --obtained.--; and
    Line 59, "as shown" should read --As shown--
        and "FIG. 3(b). A" should read FIG. 3(b), a--.

COLUMN 6

Line 60, "device 4." should read --device 40.--.

UNITED STATES PATENT AND TRADEMARK OFFICE
CERTIFICATE OF CORRECTION

PATENT NO. : 5,724,441
DATED : March 3, 1998
INVENTOR(S) : Tadashi Yoshida

It is certified that error appears in the above-identified patent and that said Letters Patent is hereby corrected as shown below:

COLUMN 7

Line 12, "image" should read --images--;
Line 32, "step S13" should read --step S12--;
Line 46, "image" should read --images--;
Line 48, "image" should read --images--; and
Line 61, "character-imager" should read --character-image--.

COLUMN 8

Line 43, "missing in" should read --missing--.

COLUMN 9

Line 2, "quatization" should read --quantization--.

COLUMN 10

Line 5, "first" should read --a first--; and
Line 51, "by first" should read --by a first--.

Signed and Sealed this

First Day of September, 1998

Attest:

BRUCE LEHMAN

Attesting Officer

Commissioner of Patents and Trademarks